United States Patent
Yao et al.

(10) Patent No.: US 11,697,345 B2
(45) Date of Patent: Jul. 11, 2023

(54) VEHICLE INTERACTION SYSTEM AS WELL AS CORRESPONDING VEHICLE AND METHOD

(71) Applicant: Ford Global Technologies, LLC, Dearborn, MI (US)

(72) Inventors: Jiang Yao, Nan Jing (CN); Qiong Shang, Shanghai (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/653,080

(22) Filed: Mar. 1, 2022

(65) Prior Publication Data

US 2022/0332190 A1 Oct. 20, 2022

(30) Foreign Application Priority Data

Apr. 20, 2021 (CN) .......................... 202110422940.X

(51) Int. Cl.
| | |
|---|---|
| *B60K 35/00* | (2006.01) |
| *G06T 3/20* | (2006.01) |
| *G06T 13/40* | (2011.01) |
| *G06T 13/80* | (2011.01) |
| *H04N 5/272* | (2006.01) |
| *G06F 3/14* | (2006.01) |
| *H04L 67/1095* | (2022.01) |

(Continued)

(52) U.S. Cl.
CPC ................ *B60K 35/00* (2013.01); *G06F 3/14* (2013.01); *G06T 3/20* (2013.01); *G06T 13/40* (2013.01); *G06T 13/80* (2013.01); *H04N 5/272* (2013.01); *B60K 2370/143* (2019.05); *B60K 2370/146* (2019.05); *B60K 2370/148* (2019.05); *B60K 2370/166* (2019.05); *B60K 2370/178* (2019.05); *B60K 2370/182* (2019.05); *B60K 2370/21* (2019.05); *G01C 21/3691* (2013.01); *G06F 3/011* (2013.01); *G06F 3/017* (2013.01); *H04L 67/1095* (2013.01)

(58) Field of Classification Search
CPC ........... G06T 13/80; G06T 13/40; G06T 3/20; B60K 35/00; B60K 2370/146; B60K 2370/182; B60K 2370/148; B60K 2370/178; B60K 2370/143; B60K 2370/21; B60K 2370/166; H04N 5/272; G06F 3/14; G06F 3/011; G06F 3/017; H04L 67/1095; G01C 21/3691
See application file for complete search history.

(56) References Cited

U.S. PATENT DOCUMENTS 10,554,596 B1 * 2/2020 Fish ..................... H04L 51/046
10,936,157 B2 * 3/2021 Voss ........................ H04L 51/04
(Continued)

*Primary Examiner* — Christopher E Leiby
(74) *Attorney, Agent, or Firm* — Brandon Hicks; Eversheds Sutherland (US) LLP

(57) ABSTRACT

According to an aspect of the present disclosure, an interaction system for a first vehicle is provided, which comprises a processor and a memory storing processor-executable instructions that, when executed by the processor, cause the latter to implement steps comprising: receiving a first input from the first vehicle and displaying a first avatar on a display; and receiving a second input from a second vehicle and displaying a second avatar on the display, wherein the first input and the second input are updated in real time, and the first avatar and the second avatar dynamically change accordingly.

16 Claims, 11 Drawing Sheets

(51) Int. Cl.
　　　*G06F 3/01*　　　　(2006.01)
　　　*G01C 21/36*　　　(2006.01)

(56)　　　　　　References Cited

U.S. PATENT DOCUMENTS

| | | | | |
|---|---|---|---|---|
| 2014/0218371 | A1* | 8/2014 | Du | G06T 13/40 |
| | | | | 345/473 |
| 2014/0309893 | A1* | 10/2014 | Ricci | B60R 25/20 |
| | | | | 701/1 |
| 2014/0347368 | A1* | 11/2014 | Kishore | G01C 21/20 |
| | | | | 701/538 |
| 2014/0351351 | A1* | 11/2014 | Yu | H04L 51/222 |
| | | | | 709/206 |
| 2014/0362195 | A1* | 12/2014 | Ng-Thow-Hing | G06V 40/20 |
| | | | | 348/51 |
| 2016/0294958 | A1* | 10/2016 | Zhang | H04W 4/02 |
| 2016/0295384 | A1* | 10/2016 | Shan | H04W 4/08 |
| 2018/0295092 | A1* | 10/2018 | Peiris | G06Q 50/01 |
| 2018/0315134 | A1* | 11/2018 | Amitay | H04L 51/222 |
| 2019/0355178 | A1* | 11/2019 | Hermina Martinez | H04W 4/40 |
| 2020/0068434 | A1* | 2/2020 | Pedersen | H04L 67/12 |
| 2020/0312004 | A1* | 10/2020 | Han | G06V 40/103 |
| 2021/0285786 | A1* | 9/2021 | Kaneko | G06Q 50/01 |
| 2022/0034677 | A1* | 2/2022 | Profendiner | H04W 4/46 |
| 2022/0086203 | A1* | 3/2022 | Morris | G06F 3/165 |
| 2022/0261119 | A1* | 8/2022 | Han | G06F 3/0481 |
| 2022/0277505 | A1* | 9/2022 | Baszucki | H04L 65/1089 |

\* cited by examiner

| Content Page of Avatar | | | | |
|---|---|---|---|---|
| Picture Nickname Attribute Level LV1 | | | | |
| Advice: State: Oil/Electric Various Maintenance Fluids Month/Week Mileage Statistics Maintenance··· | My Equipment | Go To Mall | My Friends | Virtual Race |
| | Sports Kit | | A | |
| | Body Modification | | B | |
| | Maintenance Service | | C | |

VEHICLE INTERACTION SYSTEM AS WELL AS CORRESPONDING VEHICLE AND METHOD

CROSS-REFERENCE TO RELATED APPLICATIONS

The present disclosure claims priority to and the benefit of Chinese application No. 202110422940X, filed Apr. 20, 2021, which is hereby incorporated by reference herein in its entirety.

FIELD

The present disclosure generally relates to vehicle field, and more particularly to a vehicle interaction system as well as a corresponding vehicle and method.

BACKGROUND

In modern vehicles, drivers typically access vehicle functions, applications, and various information via vehicle interaction systems. The increasingly complex functions and controls present challenges for human-machine interface interaction. In order to further enhance user experience, in some existing designs, it is proposed to establish an emotional connection between occupants and vehicles through an emotional intelligent electronic occupant interface. For example, Chinese patent CN102120455 provides a solution to communicate with occupants using simultaneous voice and avatar, and use voice recognition, vision and traditional controls to receive information from the occupants. In addition, a visual reminder of when the vehicle requires a maintenance service is also provided.

However, the current solutions do not focus on how to better present relevant functions and/or information between different users of vehicle or between vehicles, and how to interact more intelligently is a research direction of the applicants of the present disclosure.

SUMMARY

The present disclosure summarizes aspects of the embodiments and should not be used to limit the claims. Other implementations are contemplated in accordance with the techniques described herein, as will be apparent upon examination of the following drawings and detailed description, and such implementations are intended to be within the scope of this application.

According to an aspect of the present disclosure, an interaction system for a first vehicle is provided, comprising a processor and a memory storing processor-executable instructions that, when executed by the processor, cause the latter to implement steps comprising: receiving a first input from the first vehicle and displaying a first avatar on a display; and receiving a second input from a second vehicle and displaying a second avatar on the display, wherein the first input and the second input are updated in real time, and the first avatar and the second avatar dynamically changes accordingly.

In an embodiment, the first input and the second input include one or more of the following: fault information, warning information, travel information, mileage information, road environment information, schedule reminders, weather reminders, emergency traffic alerts, call reminders, social software reminders, and reminders set by other applications.

In another embodiment, the first input and the second input further include interaction information from a user, wherein the interaction information from the user include any one or more of the following: voice, touch, text input, facial expressions or actions, hand gestures or actions, head gestures or actions, and body gestures or actions.

In yet another embodiment, the steps further comprise: prioritize the first input and the second input; and dynamically changing the first avatar and the second avatar accordingly in response to the priority.

In yet another embodiment, the steps comprise: receiving input data from a first camera device of the first vehicle, and displaying on the display a visual output of the first avatar superimposed with the input data.

In yet another embodiment, the steps comprise: receiving input data from a second camera device of the second vehicle, and displaying on the display a visual output of the second avatar superimposed with the input data.

In yet another embodiment, the steps further comprise: synchronizing the first avatar to a cloud for access by other clients of users of the first vehicle.

In yet another embodiment, the steps further comprise: initiating a proposal to for sharing the first avatar to a recipient user, and sharing real time state of the first avatar with the recipient user in response to receipt of feedback from the recipient user agreeing to share.

In yet another embodiment, the steps further comprise: receiving a request for sharing the first avatar from a requester user, issuing feedback agreeing or refusing the request, and sharing real time state of the first avatar with the requester user based on the feedback agreeing the request.

In yet another embodiment, the steps comprises: receiving first navigation path information from the first vehicle, and displaying movement of the first avatar along the first navigation path information.

In yet another embodiment, the steps comprises: receiving second navigation path information from the second vehicle, and displaying movement of the second avatar along the second navigation path information.

In yet another embodiment, the steps comprise: dividing a navigation interface of the display into a main display area and an auxiliary display area, wherein the movement of the first vehicle is displayed in the main display area on a first scale and the movement of the second avatar is displayed in the auxiliary display area on a second scale.

In yet another embodiment, the steps comprises: dividing a navigation interface of the display into a main display area and an auxiliary display area, wherein the movement of the first avatar and the second avatar are displayed in the main display area on a navigation map interface, and data from a camera device of the first vehicle and/or data from a camera device of the second vehicle are displayed in the auxiliary display area.

In yet another embodiment, the steps comprise: displaying on the display the movement of the first avatar and/or the second virtual along a virtual path different from an actual navigation path of the first vehicle and the second vehicle.

According to another aspect of the present disclosure, an interaction method for a first vehicle and a second vehicle is provided, wherein the first vehicle includes a processor and a memory storing processor-executable instructions that, when executed by the processor, cause the latter to implement steps comprising: receiving a first input from the first vehicle and displaying a first avatar on a display; receiving a second input from the second vehicle and displaying a second avatar on the display, wherein the first input and the second input are updated in real time, and the first avatar and the second virtual dynamically changes.

In an embodiment, the first input and the second input include one or more of the following: fault information, warning information, travel information, mileage information, road environment information, schedule reminders, weather reminders, emergency traffic alerts, call reminders, social software reminders, and reminders set by other applications.

In another embodiment, the first input and the second input further include interaction information from a user, wherein the interaction information from the user include any one or more of the following: voice, touch, text input, facial expressions or actions, hand gestures or actions, head gestures or actions, and body gestures or actions.

In yet another embodiment, the steps further comprise: prioritize the first input and the second input; and dynamically changing the first avatar and the second avatar accordingly in response to the priority.

In yet another embodiment, the steps further comprise: initiating a proposal for sharing the first avatar to a recipient user by a user of the first vehicle, and sharing real time state of the first avatar with the recipient user in response to receipt of feedback from the recipient user agreeing to share.

In yet another embodiment, the steps further comprise: receiving a request for sharing the first avatar from a requester user, issuing feedback agreeing or refusing the request, and sharing real time state of the first avatar with the requester user based on the feedback agreeing the request.

BRIEF DESCRIPTION OF THE DRAWINGS

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further in the figures, like referenced numerals refer to like parts throughout the different figures.

DETAILED DESCRIPTION

Figure 1:
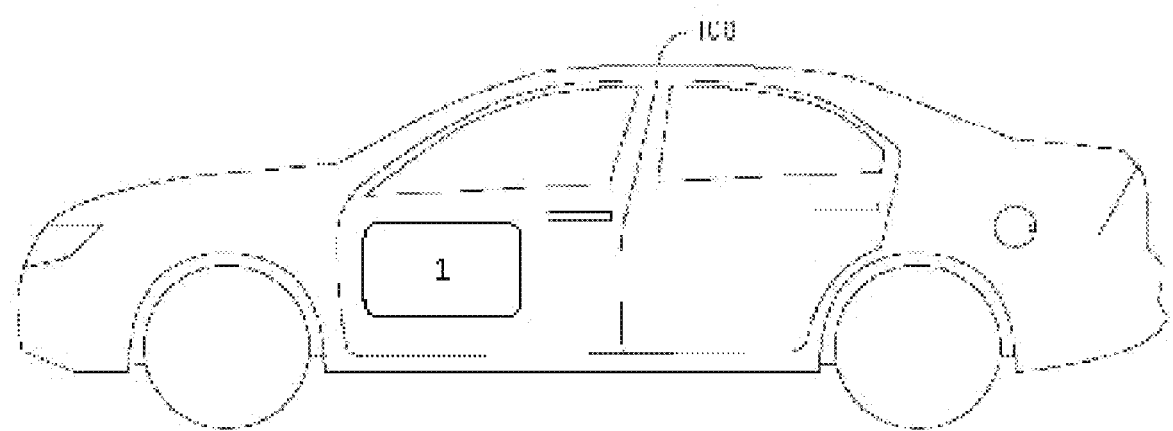
FIG. 1 shows a vehicle comprising an interaction system according to the present disclosure.

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the present disclosure in various ways. As those of ordinary skill in the art will understand, the various features shown and described with reference to any one drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

One or more embodiments of the present disclosure will be described below with reference to the accompanying drawings. The flowchart illustrates the process performed by the system. It can be understood that the execution of the flowchart does not need to be performed in sequence, one or more steps may be omitted, or one or more steps may be added, and one or more steps may be performed sequentially or in reverse order, and even in some embodiments may be performed concurrently.

The following embodiments involve "user", "driver", "virtual character", "other clients of a same user", etc., which in one or more embodiments are used to describe interaction between a vehicle and a user, and in some cases, roles may be exchanged or other names may be used without departing from the spirit of the present disclosure.

As mentioned in the background of the present disclosure, the vehicle drivers typically access vehicle functions, applications, and various information via the vehicle interaction systems. In order to enhance experience, in some existing designs, it is proposed to establish an emotional connection between occupants and vehicles through an emotional intelligent electronic occupant interface. For example, Chinese patent CN102120455 provides a solution to communicate with occupants using simultaneous voice and avatars, and use voice recognition, vision and traditional controls to receive information from the occupants. However, the applicant of the present disclosure realizes that there is still room for further research and improvement in the intelligent interaction between multiple vehicles, such as social interaction between interrelated family members or friends through vehicle platforms. One or more non-limiting embodiments of the present disclosure propose how to more conveniently interact between multiple vehicles in a form of a more intelligent avatar.

One or more embodiments of the present disclosure may be applicable to a variety of vehicles. For example, referring to vehicle 100 in the figures, it may be a standard gasoline-powered vehicle, a hybrid vehicle, an electric vehicle, a fuel cell vehicle and/or any other types of vehicles, and may also be a bus, a ship, or an aircraft. The vehicle includes components related to mobility, such as engine, electric motor, transmission, suspension, drive shaft, and/or wheels. The vehicle can be non-autonomous, semi-autonomous (for example, some conventional motion functions are controlled by the vehicle) or autonomous (for example, the motion functions are controlled by the vehicle without direct input from the driver).

Figure 2:
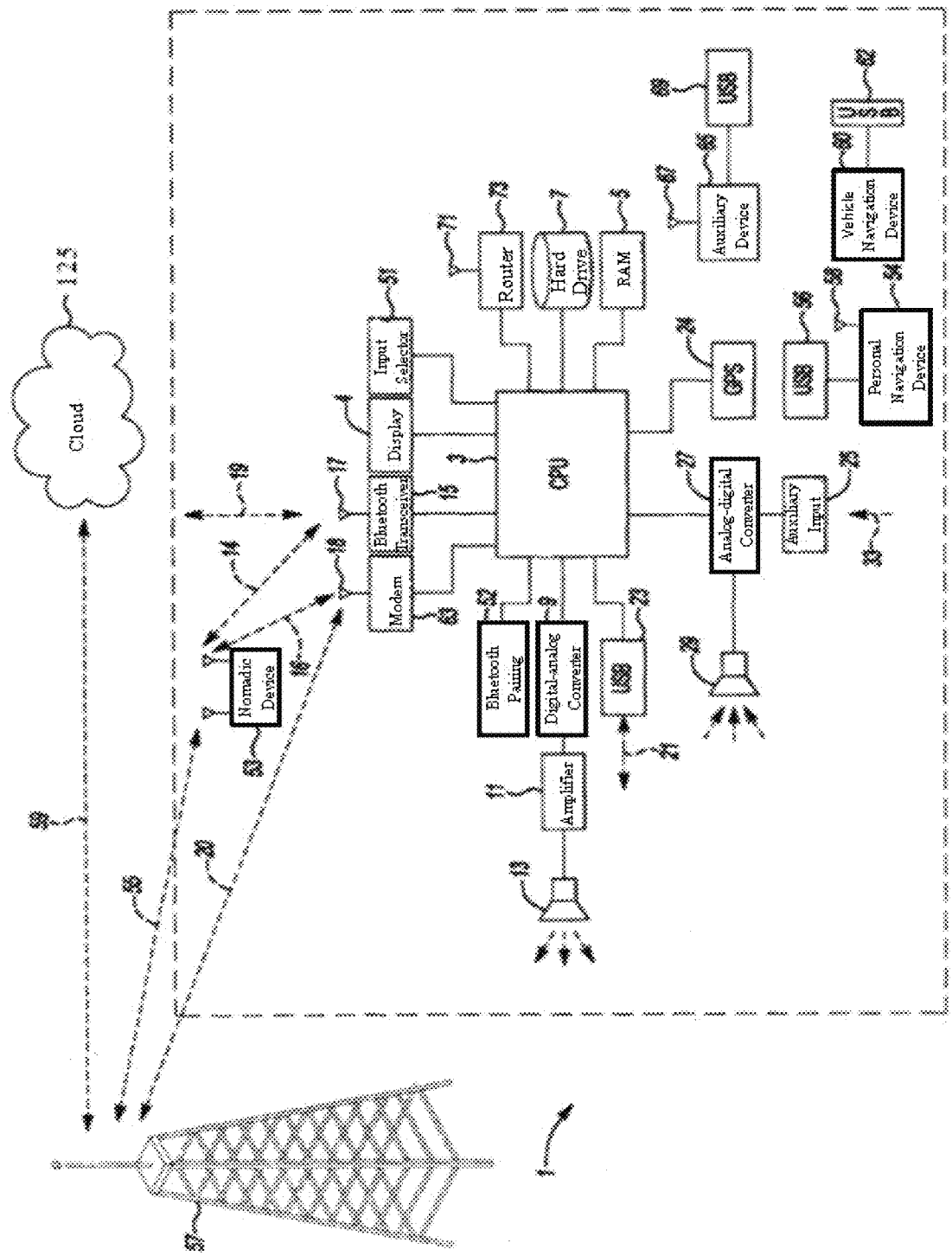
FIG. 2 shows an exemplary block topology of an interaction system according to the present disclosure.

FIG. 1 shows a vehicle 100 according to the present disclosure, which includes an interaction system 1. In this embodiment, the interaction system 1 is shown as an in-vehicle interaction system 1 located in the vehicle. Those skilled in the art can understand that a part or multiple parts of the interaction system 1 may also be located outside the vehicle, for example, the memory may be located in a cloud, and the processor may also be located in the cloud in some embodiments. In yet other embodiments, the interaction system may also include a server located outside the vehicle that communicates with it via a communication protocol. It can also be understood that in other usage scenarios, one or more embodiments of the present disclosure may further include an interaction method and system using one or more mobile devices. FIG. 2 shows an embodiment of the in-vehicle interaction system. As further shown in the exemplary block topology of the vehicle interaction system in FIG. 2, in the context of the in-vehicle interaction system, the vehicle interaction system 1 may include a processor 3 and a memory 7, the memory 7 stores processor-executable instructions that, when executed by the processor 3, cause the latter to implement one or more of the steps shown in FIGS. 3-13.

Hereinafter, an exemplary hardware environment of the vehicle interaction system (also referred to as a vehicle computing system VCS) 1 for the vehicle 100 will be described with reference to FIG. 2. An example of an operating system built into the vehicle interaction system 1 is the SYNC or SYNC+ system manufactured by Ford Motor Company. The vehicle equipped with the vehicle interaction system 1 may include a display 4 located therein. The display 4 may be one or more displays that individually or cooperatively present an interactive interface. By way of example and not limitation, the display may include CRT (Cathode Ray Tube) display, LCD (Liquid Crystal) display, LED (Light Emitting Diode) display, PDP (Plasma Display), laser display, VR (Virtual Reality) display, etc. . . . . In other embodiments, the display 4 may also be a projection display that projects onto windshields or side windows or any suitable surface of the vehicle.

The processor (CPU) 3 in the vehicle interaction system 1 may control at least part of the operation of the vehicle interaction system 1. In one or more embodiments, the processor 3 is capable of executing on-board processing instructions and programs, e.g., the processor may process one or more executable instructions for the vehicle interaction system 1. The processor 3 may be connected to a non-persistent memory 5 and a persistent memory 7. The memories 5, 7 may include volatile and non-volatile memories such as Read Only Memory (ROM), Random Access Memory (RAM) and Keep Alive Memory (KAM) etc. Those skilled in the art will appreciate that in one or more embodiments of the present disclosure, the memories 5 and/or 7 can be implemented using any number of known storage devices (such as Programmable Read Only Memory (PROM), EPROM (Electrically Programmable Read Only Memory), EEPROM (Electrically Erasable Programmable Read Only Memory), flash memory or any other electronic, magnetic, optical or combined storage devices capable of storing data). The memories 5, 7 may store, for example, processor-executable instructions of the in-vehicle interaction system 1.

In one or more embodiments, the processor 3 may also be configured to receive and process a number of different inputs, thereby allowing a user to interact with the processor. In an illustrative embodiment, the inputs include a microphone 29 configured to receive voice signals, an auxiliary input 25 for an input 33 (e.g. CD (Compact Disc), tape, etc.), a USB (Universal Serial Bus) input 23, a GPS (Global Positioning System) input 24, and a Bluetooth input 15. An input selector 51 is also provided to allow the user to switch among various inputs. The input at the microphone and auxiliary connector can be converted from an analog signal to a digital signal by a converter 27 before being passed to the processor. In addition, although not shown, a plurality of vehicle components and auxiliary components that communicate with the vehicle interaction system may transmit data to or receive data from the vehicle interaction system 1 (or its components) via a vehicle network (such as but not limited to CAN (Controller Area Network) bus).

Additionally, the processor 3 may communicate with multiple vehicle sensors and drivers via an input/output (I/O) interface which may be implemented as single integrated interfaces that provide multiple raw data or signal adjustment, processing and/or conversion, short-circuit protection, etc. Further, the sensors that communicate with the processor 3 may include, by way of example, but not limited to, cameras, ultrasonic sensors, pressure sensors, fuel level sensors, engine speed sensors, temperature sensors, photoplethysmography sensors, etc., to identify user interaction information such as button presses, voice, touch, text input, facial expressions or actions, hand gestures or actions, head gestures or actions, and body gestures or actions, as well as to identify vehicle information such as fuel level, powertrain system failure, temperature inside the vehicle, etc.

The output of the vehicle interaction system 1 may include, but not limited to, the display 4, a speaker 13, and various actuators. The speaker 13 may be connected to an amplifier 11 and receive signal from the processor 3 via a digital-analog converter 9. The output of the system can also be output to a remote Bluetooth device (such as a personal navigation device 54) or a USB device (such as a vehicle navigation device 60) along bidirectional data streams indicated by 19 and 21, respectively.

In an illustrative embodiment, the vehicle interaction system 1 communicates with a nomadic device 53 (e.g., cellular phone, smart phone, personal digital, etc.) of the user via an antenna 17 of a Bluetooth transceiver 15. The nomadic device 53 may in turn communicate 59 with a cloud 125 outside the vehicle 31 via, for example, communication 55 with a cellular tower 57. In some embodiments, the cellular tower 57 may be a Wi-Fi (Wireless Local Area Network) access point. Signal 14 represents exemplary communication between the nomadic device 53 and the Bluetooth transceiver 15. Pairing between the nomadic device 53 and the Bluetooth transceiver 15 may be indicated through a button 52 or similar input, thereby indicating to the processor 3 that the Bluetooth transceiver in the vehicle is paired with a Bluetooth transceiver in the nomadic device.

Data can be transferred between the processor 3 and the cloud 125 via, for example, data-plan, data over voice, or Dual-Tone Multi-Frequency (DTMF) tones associated with the nomadic device 53. Alternatively, the vehicle interaction system 1 may include an in-vehicle modem 63 with an antenna 18 to transfer 16 data between the processor 3 and the nomadic device 53 via a voice band. Subsequently, the nomadic device 53 can communicate 59 with the cloud 125 outside the vehicle 31 via, for example, the communication 55 with the cellular tower 57. In some embodiments, the modem 63 may directly establish communication 20 with the cellular tower for further communication with the cloud 125. As a non-limiting example, the modem 63 may be a USB cellular modem and the communication 20 may be cellular communication.

In an illustrative embodiment, the processor is provided with an operating system including an API (Application Programming Interface) that communicates with modem application software. The modem application software may access an embedded module or firmware on the Bluetooth transceiver 15 to communicate wirelessly with a remote Bluetooth transceiver (for example, the Bluetooth transceiver in the nomadic device). The Bluetooth is a subset of an IEEE 802 PANs (Personal Area Networks) protocol. An IEEE 802 LAN (Local Area Network) protocol includes Wi-Fi and has a lot of cross-functionality with the IEEE 802 PAN. Both of them are suitable for wireless communication in vehicles. Other communication methods can include free-space optical communication (for example, Infrared Data Association, IrDA) and non-standard consumer infrared (consumer IR) protocols, and so on.

In an embodiment, the nomadic device 53 may be a wireless Local Area Network (LAN) device capable of communicating via, for example, an 802.11 network (for example, Wi-Fi) or a WiMax (Worldwide Interoperability Microwave Access) network. Other sources that can interact with the vehicle include a personal navigation device 54 with, for example, a USB connection 56 and/or an antenna 58, or a vehicle navigation device 60 with a USB 62 or other connection, a vehicle GPS device 24, or a remote navigation system (not shown) connected to the cloud 125.

In addition, the processor 3 can communicate with a number of other auxiliary devices 65. These auxiliary devices 65 can be connected to each other via wireless connections 67 or wired connections 69. Likewise or alternatively, the CPU may connect to a vehicle-based wireless router 73 via, for example, a Wi-Fi 71 transceiver. This may allow the CPU to connect to a remote network within the range of the local router 73. The auxiliary device 65 may include, but not limited to, a personal media player, a wireless health device, a mobile computer, and the like.

Figure 3:
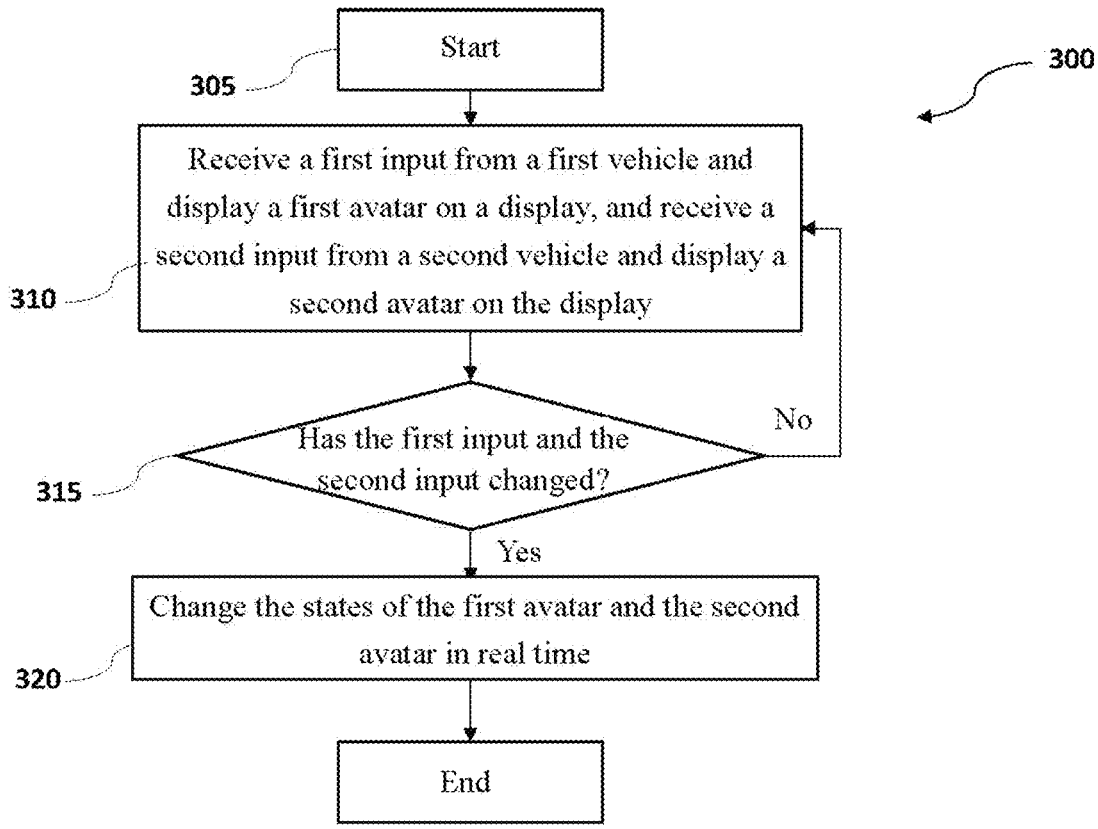
FIG. 3 shows a block diagram of steps implemented when executable instructions included in an embodiment of an interactive system according to the present disclosure are executed.

Specifically, the concept of the present disclosure will be further described below with reference to FIG. 3, which shows a process 300 of steps implemented when executable instructions included in an embodiment of the vehicle interaction system 1 according to the present disclosure are executed. In the described embodiment, the steps include: receiving a first input from a first vehicle and displaying a first avatar on a display, receiving a second input from a second vehicle and displaying a second avatar on the display, and then determining whether the first input and the second input have changed, and if so, causing the first avatar and the second avatar to make corresponding dynamic changes. Specifically, the process 300 begins at block 305, such as, but not limited to, any time the vehicle interaction system 1 detects that a user is inside the vehicle 100. In one example, the vehicle interaction system 1 may detect that the user is inside the vehicle 100 through sensors such as microphones, cameras, touch sensors, pressure sensors, or pairing with nomadic devices. In some usage scenarios, such as a scenario where one or more vehicles are shared by a family, when the vehicle is used by one of the family members, other family members, that is, authorized users, can also enter the process by using an off-board client. At this time, the block 305 may begin when the associated authorized user opens a corresponding program interface. For example, the user can enter a corresponding management interface through an application or applet such as Ford Pass®, Lincoln Way®, etc., and can view state change of the corresponding avatar. Those skilled in the art can understand that a user with vehicle management permissions can enter the viewing or management interface of the avatar through an APP while the vehicle is parked.

The process 300 then proceeds from block 305 to block 310, where a first input from a first vehicle and a second input from a second vehicle can be received. The receiving step may occur at a vehicle side of the first vehicle, or at one or more clients of the user of the first vehicle. Of course, similarly, this step may also occur at an vehicle side of the second vehicle and associated user clients of the second vehicle.

In one or more embodiments described here or elsewhere, the vehicle interaction system 1 may monitor the first input through sensors, external services, and/or applications, etc. In one embodiment, the first input and the second input respectively include one or more of fault information, warning information, travel information, mileage information, road environment information, schedule reminders, weather reminders, emergency traffic alerts, call reminders, social software reminders, and reminders set by other applications associated with the first vehicle and the second vehicle.

In one or more embodiments, examples of the fault information may be insufficient tire pressure of the first vehicle and the second vehicle, or, for example, a lamp failure. These faults may be displayed and reminded by preset animations that show abnormality in different parts such as feet, hooves, eyes, etc. of a anthropomorphic avatar. Examples of the warning information may be, for example, oil level reminders, fuel level reminders, or battery SOC only enough to drive a certain distance, etc. These reminders or warnings may be displayed as, for example, a preset avatar showing a hungry state, etc. Examples of the travel information can be information on a planned destination, such as the user plans to go to Building A in the morning, this information can be selectively displayed in the form of floating windows, bubbles near the avatar, or displayed as a text reminder information from the avatar. In some embodiments, the mileage information may include a mileage mark of the vehicle, and the corresponding avatar may also have a growth value or an experience value corresponding to an increase in the mileage.

In one or more embodiments, the road environment information may be, for example, narrowing of road ahead, construction of the current lane, traffic jam ahead, etc., and this information may be displayed or played to the owner of the current vehicle in the form of reminders provided by the avatar. Further, if the second vehicle is interconnected with the first vehicle, the corresponding second avatar can display the corresponding vehicle state on the display interface of the first vehicle, for example, expressions corresponding to the second avatar currently unable to move forward, congestion ahead, etc. are displayed on the display screen of the first vehicle. In this way, after interconnecting with the first vehicle, state change of the second avatar can be intuitively observed in the first vehicle. In still other embodiments, for the schedule reminders, the corresponding avatar may remind the user of the planned schedule, for example, remind the user that a certain task needs to be performed. Based on the user's interconnection state and permission settings for sharing, the second user avatar can also display the upcoming schedule of the second user, and the first user is informed of such reminders based on his viewing permission, received information, and the like. The schedule reminders may also include reminders of solar terms, festivals, anniversaries, etc., and these reminders may be reflected by the avatar's dress, background, and the like.

In still other embodiments, the weather reminders may include reminders of rain and snow, temperature reminders, etc. obtained from the cloud, other media or mobile devices, and vehicle sensors, and the corresponding avatar may change dress according to the weather conditions to show different weather. In some embodiments, emergency traffic alerts may include road closures, construction and similar vehicle road conditions alerts. The call reminders, social software reminders, and reminders set by other applications can also be associated with the avatar, so that many reminders can be reflected through an avatar, avoiding the need for users to obtain information they need from different displays and devices, and simplifying operations. Also, as described below, one or more users may set preferences, priorities, and one or more messages prompted through the avatar.

In another embodiment, the first input and the second input further include interaction information from the user, wherein the interaction information from the user includes any one or more of the following: voice, touch, text input, facial expressions or actions, hand gestures or actions, head gestures or actions, and body gestures or actions. In the case where the first vehicle and the second vehicle are interconnected, for example, the second user of the second vehicle may issue a voice interaction message to other vehicles, such as "XX, good morning", and the message sent by the user in the second vehicle may be directly communicated to the user interface of the first vehicle via the second avatar. It can be understood that the exemplified voice information can be directly interacted through V2V in the form of the avatar, and can also be done through other social software. The information when interacting with third-party applications can also be selectively invoked and interpreted through the first or second avatar according to user settings, or converted into text for display to other associated users. In other embodiments, the users of the first vehicle and the second vehicle may also complete specific inputs by touching the display screen, such as selecting specific vehicle accessories, selecting music playback, and the like. In still other embodiments, it is also possible to generate specific instructions by the user entering a text message, such as, but not limited to, selecting a destination when navigating. These inputs can be presented around the avatar, and when these inputs are being received, the state of the avatar being input, typing, thinking, etc. can be displayed. In some embodiments, information may also be conveyed through facial expressions or actions, hand gestures or actions, head gestures, and body gestures or actions. For example, the second user can make specific actions such as waving, smiling, nodding, etc. to transmit a message to the first user through the second avatar. Specifically, for example, when the interaction of the avatar is enabled, in-vehicle camera devices can capture a specific user's shaking and nodding, specific gestures, etc., and transmit it to the second vehicle through a similar simulated action of the preset avatar. Of course, these actions or gestures and the like can also be combined with other inputs, such as voice, etc., to transmit comprehensive messages. Those skilled in the art can make various modifications as required.

In a specific embodiment, the vehicle interaction system 1 may receive input from vehicle sensors and visualize the change of the avatar. For example, in one embodiment, the first avatar is a cartoon character with a "horse" as the main body, and the user can choose and customize the character of the "horse" in a virtual mall according to their own preferences. In a specific scenario, when the tire pressure of the vehicle is abnormal, it can be visualized that the horseshoe of the avatar is abnormal. Specific examples of the character changes of the first avatar and the second avatar can also refer to, for example, the description of the applicant in CN101669090, titled "Emotional Prompting System and Method", in which changes related to vehicle state are expressed in an anthropomorphic manner, and the entire contents of which are incorporated by reference. In another specific embodiment, for different weather conditions, for example, when the vehicle sensor senses rain, snow, cold weather or low temperature, the temperature change can be reminded by changing the clothes of the avatar. Of course, this weather and temperature information can also come from the cloud or other social media. For another example, according to calendar information combined with the weather conditions, when it comes to spring, a situational reminder of a pony on a spring outing can also be displayed. In yet another embodiment, different dress and environmental backgrounds for the avatar can be set in different festivals according to the calendar information. For example, during Spring Festival, the Spring Festival dress can be set as a default setting, or can also be available as an optional option for the user to choose.

In yet another embodiment, the user of the second vehicle may also interact with the user of the first vehicle through the second avatar, e.g., the user of the second vehicle may virtually "greet" with the user of the first vehicle. For example, in one embodiment, when a waving action input by the owner or user of the second vehicle is perceived and captured through the in-vehicle sensor or camera of the second vehicle and corresponding voice information is captured through the microphone, the second avatar can be made to simulate social scenarios like "Hi, how are you!" and/or presented with voice. Of course, the way of greeting can be customized by the user. In one or more of the above-mentioned embodiments, the visual fault reminder is different from the warning light or other text messages, and is usually not easily ignored by the user. The social attributes provided by this solution can make the interaction between vehicle users more friendly and interesting. In other embodiments, when the first vehicle encounters a fault or other problem, it is also very convenient to enable other users to know the state of the first vehicle in time without the need for the user of the first vehicle to make calls, send messages, etc. through other social software to communicate. For another example, the second avatar displayed on the first vehicle may also be displayed in a state of answering a phone, so that the user of the first vehicle can know that the user of the second vehicle is busy. These faults or busy states can be reflected to other related vehicle side or clients in time, avoiding the additional steps of communicating through social tools.

In one or more embodiments, movement of the first avatar and the second avatar along a navigation path may also be displayed on the navigation interface. The term "movement" as used here or elsewhere in this application may refer to the movement of a static avatar on the map with the location of the avatar on the navigation path, or it can be the avatar moving on the map with animation effects such as "pony" galloping, or any possible way of dynamically changing. In one embodiment, when vehicles of multiple users travel in a group, one or more users can easily distinguish different users and corresponding driving positions through multiple avatars. Further, as described in the following detailed description, multiple users can also share the environment where the avatar is located, for example, different users can see other people driving under different road conditions, thereby further enhancing the interaction and fun. In yet another embodiment, different levels for the avatar can also be defined according to the mileage. For example, a user with a higher mileage and a stable driving style can obtain a level or a predetermined type of medal. In this way, positive driving behaviours such as fuel economy, prudence, safe driving without speeding, no violations, etc. can be encouraged in a fun way, and predetermined level or medals can be set in a single player mode among one or more avatars, or some medals can be set to be earned in a multiplayer interactive mode.

In other embodiments, the vehicle interaction system 1 may utilize, for example, microphone, camera, touch sensor, ultrasonic sensor, or the like to identify the above-mentioned first and second inputs. The processor 3 of the vehicle interaction system 1 may receive the input from the sensor to identify the voice, touch, text input, predetermined gesture or action of the user and obtain the interaction information of the user therefrom. Combining several interaction methods can significantly improve the interaction efficiency with users. When the first input and the second input are voice information, the vehicle interaction system 1 can recognize the information and convert it into text for display in the display 4. In one or more embodiments, the voice message issued by the user of the second vehicle or the converted text message may be presented to other vehicles, such as the first vehicle, through the second avatar, e.g., presented as an incoming call from the second avatar pony, new voice or text message from the second avatar pony. The user of the first vehicle can selectively handle, for example, the user can choose to answer, view, or respond.

At step 310, the vehicle interaction system 1 of the first vehicle may receive the first input from the first vehicle and the second input from the second vehicle, and display both the first avatar and the second avatar on the display 4 of the vehicle interaction system 1. For the convenience of description, here only the first vehicle is used as the main vehicle for non-limiting description, and it can be understood that the second vehicle can similarly receive input information from multiple vehicles and display associated avatars. In one usage scenario, the first vehicle and the second vehicle are vehicles of the same owner/associated family members, therefore, the user may choose to display the states of the avatars of the associated at least two vehicles by default.

In another or more embodiments, referring to the description below, the first vehicle and the second vehicle may associate the first avatar and the second avatar with each other with the permission of the users. In another usage scenario, the first vehicle and the second vehicle may be car mates traveling in a group, through the interaction between the first and second avatars, it is possible to better understand the vehicle condition, location, surrounding road conditions, whether the user's vehicle encounters problems or needs help, etc. For example, when the user of the first vehicle has not contacted the rider of the second vehicle by phone or other social means, the associated user of the second vehicle has learned some key information through the state of the avatar, such as the failure, the location of the first vehicle, etc. As mentioned above, this will facilitate fleet travel and interaction, avoid the need for users to switch between different pages during driving, in other words, avoid the cumbersome communication through other multiple social software during driving. Of course, in other embodiments, even if it is not a group of car friends to travel, the friends can use the vehicle avatar to interact based on conventional social needs. For example, a user may send weather environment around him through the avatar, or greet visually. For examples, please refer to the above examples, which will not be repeated here. In one or more of the above embodiments, when the avatar needs to be displayed, if the first vehicle is running a navigation page, the first avatar and the second avatar can be displayed on the navigation page, for example, moving as the vehicle moves. Of course, if the vehicle is not navigating or displaying navigation, a dedicated display area may also be set for displaying the first avatar and the second avatar. In some embodiments, for example, cameras inside and outside the vehicle can be called to display current state around the vehicle, state inside the vehicle, and the like, and data such as the surrounding environment can be shared with other users. Through an overall managed avatar, one or more devices and programs of the vehicle can be invoked for more convenient interaction between different users.

Next, at step 315, it is detected whether the first input and the second input have changed. For example, in the case that the above-mentioned first input is abnormal tire pressure, whether the above-mentioned abnormal tire pressure problem is solved, whether there are warnings of other new vehicle conditions and environmental conditions, and whether the user has a predefined first input, etc. can be continuously monitored. In one or more embodiments, the first and second inputs associated with the state of the avatar may be predefined and stored in the vehicle side and/or in the server elsewhere and/or in the cloud. Those skilled in the art can understand that the first and second avatars and the first and second inputs can be customized by the user, and the user can choose their preferred avatar as well as corresponding reminders and presentation mode according to their own preference. For example, a user may be interested in the interaction between driving ratings and group travel, but does not need other visual displays, such as dislikes visual alerts of vehicle failures, the user can choose to enable function modules of driving ratings and group travel, and disable the module that visualizes fault alerts. When no new input is received, or the state of the original input does not change, the current first and second avatars are continued to be displayed. And if the first input and the second input have changed, and these changes correspond to different display of the avatars, the process proceeds to 320.

At 320, the states of the first avatar and the second avatar are changed in real time according to the changed first input and the second input. For example, after the above-mentioned abnormal tire pressure problem is solved, the state of the avatar should return to a normal state. For example, the level or growth state of the avatar that increases with the increase of vehicle mileage can be set to be continuous. For example, if an experience value of a user increases to 1000 due to mileage or other driving rewards, this value will only continue to increase and not revert to the original lower value. Then the method ends. It is to be understood that the "end" of one or more example processes or methods, here or elsewhere, is only used for the convenience of illustrating the embodiment, and the example process or methods themselves may be called multiple times, for example, during operation of the vehicle. Of course, the user can selectively disable the process until the user chooses to enable it for an appropriate period of time. In other embodiments, even if the vehicle is not running, the user can call or view the state of the avatar multiple times through other clients. The changing process of the avatar with the first input will be further described in the schematic flowchart 400 below.

Figure 4:
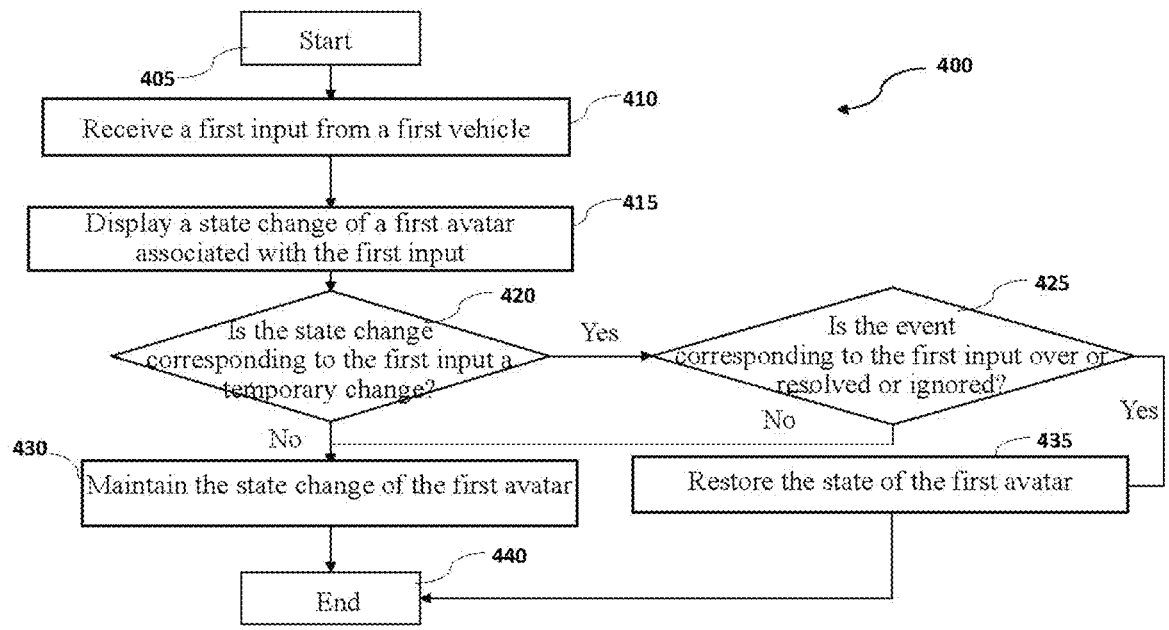
FIG. 4 shows a flowchart of steps implemented when executable instructions included in an embodiment of an interactive system according to the present disclosure are executed.

FIG. 4 describes the changing process of the first avatar. It should be understood that although the first avatar is described as an example, the second avatar may also make the same or similar changes. The method begins at 405, and the vehicle interaction system may receive a first input from a first vehicle at step 410 and display a state change of a first avatar associated with the first input at step 415. Then, at decision block 420, it is determined whether the state change corresponding to the first input is a temporary change. If it is a temporary reminder or a temporary message, the method proceeds to step 425, where it is determined whether the temporary event corresponding to the first input is over, or resolved, or ignored by the user. In a specific embodiment, the warning reminders of the vehicle are all temporary, and the messages input by the user are all temporary. In addition, for example, the dress of the avatar corresponding to festivals and weather is also temporary. Relatively speaking, the mileage experience value and the like are cumulative rather than temporary. Those skilled in the art can understand that input and state changes can be predefined. For example, the state or level of the avatar changes every 1,000 kilometers, while the avatar can restore the state before the reminder or the warning when the event of the warning reminder is resolved, or after the user has viewed the message, for example. At 420, if it is determined that the change of the avatar corresponding to the first input is not temporary, such as the avatar that changes with the mileage, the state change of the first avatar is maintained at step 430 until the next time renew. For example, the state change of the first avatar triggered by the weather, festival, etc., may continue until the weather changes and the festival passes. The method then ends at 440. The vehicle stops running, the client is closed, etc. can be used as the triggering conditions for the end.

Figure 5:
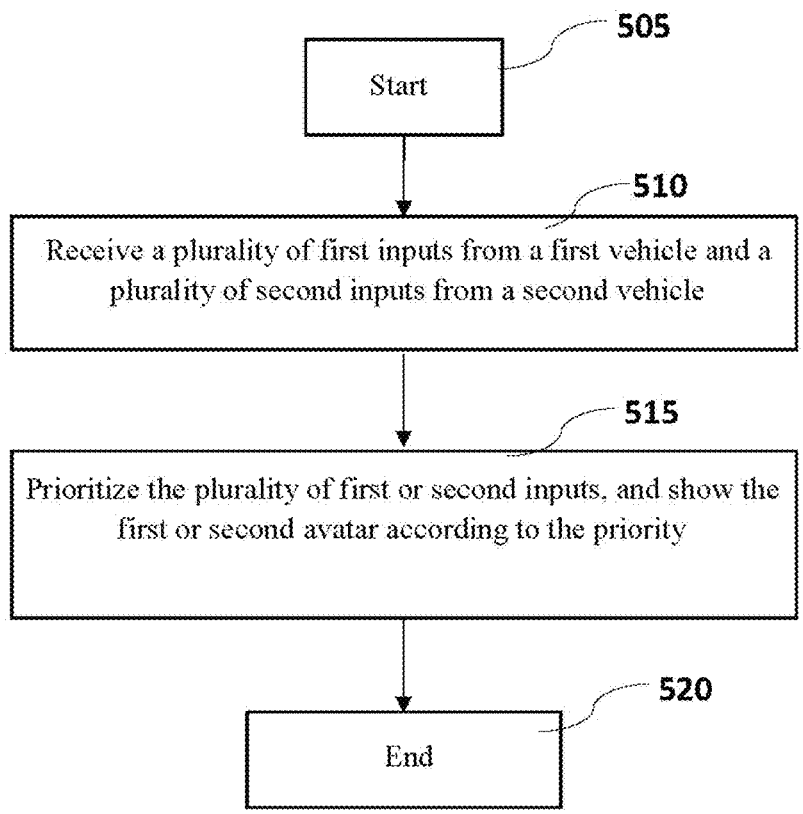
FIG. 5 shows a flowchart of steps implemented when executable instructions included in an embodiment of an interactive system according to the present disclosure are executed.

FIG. 5 depicts a schematic process with multiple inputs. The method begins at 505, and then a plurality of first inputs from a first vehicle and a plurality of second inputs from a second vehicle are received at 510, wherein the first vehicle may be a host vehicle, through which the states of a plurality of avatars are displayed. When there are multiple inputs, a priority of the display can be determined, and then the state change of the avatar can be made according to the priority. For example, safety-related feature information such as vehicle failure warning may have a highest priority, and navigation information, cruise control, and some controls of vehicle accessories may have a lower priority than failure warning information. Multimedia information and other information reminders such as festivals, weather, etc. can be reminded as a lower priority. For the second avatar, multiple second inputs may also be displayed in a priority order, for example, information presented to the first vehicle associated with passenger or driver interactions of the first vehicle such as social information (greeting) presented by the second avatar, vehicle fault information can be set to have a higher priority. While the safety reminder for the second vehicle can be prompted in the second vehicle without the need to show the changing state of the avatar displayed in the first vehicle, or at least without the need to have a high priority. Those skilled in the art can understand that the priority setting can be defined according to the user's own needs.

Figure 6:
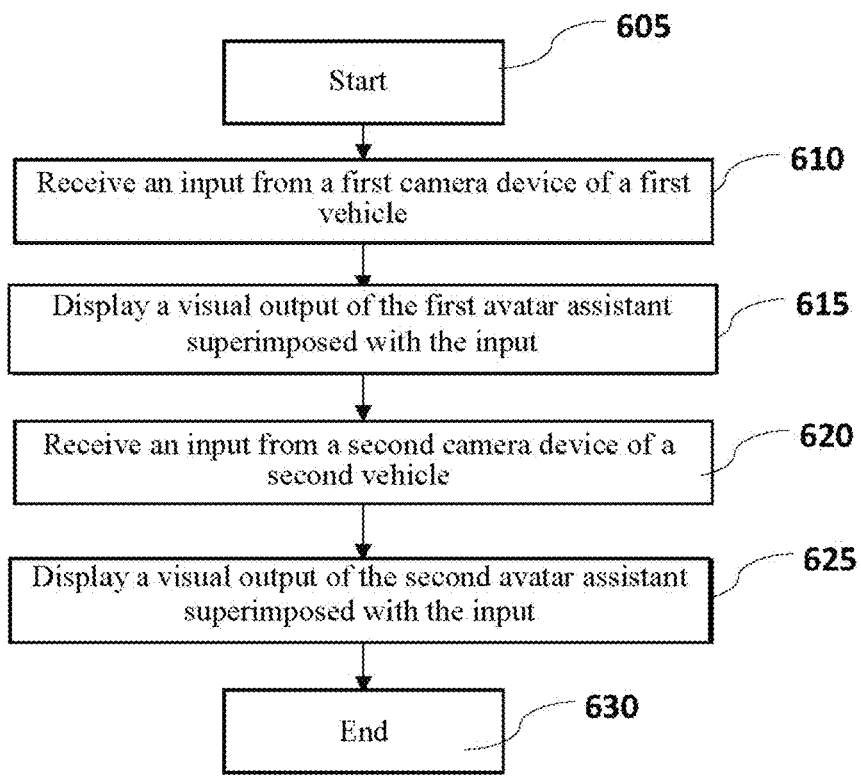
FIG. 6 shows a flowchart of steps implemented when executable instructions included in an embodiment of an interactive system according to the present disclosure are executed.

FIG. 6 shows steps of how to display the avatar and the surrounding environment in a superimposed manner in one or more embodiments of the present disclosure. The method begins at 605, for example, a user may initiate a videography by choose to enable the function. At step 610, input from a first camera device of a first vehicle is received. The first camera device may be, for example, a 360-degree camera that captures external environment data. Wherein at step 615, the first avatar may be superimposed with the environment. Regarding how to synthesize images, the applicant provides a method for image synthesis in CN107231544A, the entire contents of which are incorporated by reference. Next, at step 620, input from a second camera device of the second vehicle is received, and at step 625, the second virtual of the second vehicle is superimposed with the vehicle surroundings. Of course, the premise is that the second vehicle agrees to share the environment where the second vehicle is located. In some situations, such as when the first vehicle and the second vehicle are traveling in groups, this interactive function may provide more convenience and fun. While the users is in different places in different cities, the first vehicle and the second vehicle can share scenery along the way, which further enhances the social function. The method ends at 630 when the user exits the sharing, ends the trip, parks, or is in other defined end scenario.

Figure 7:
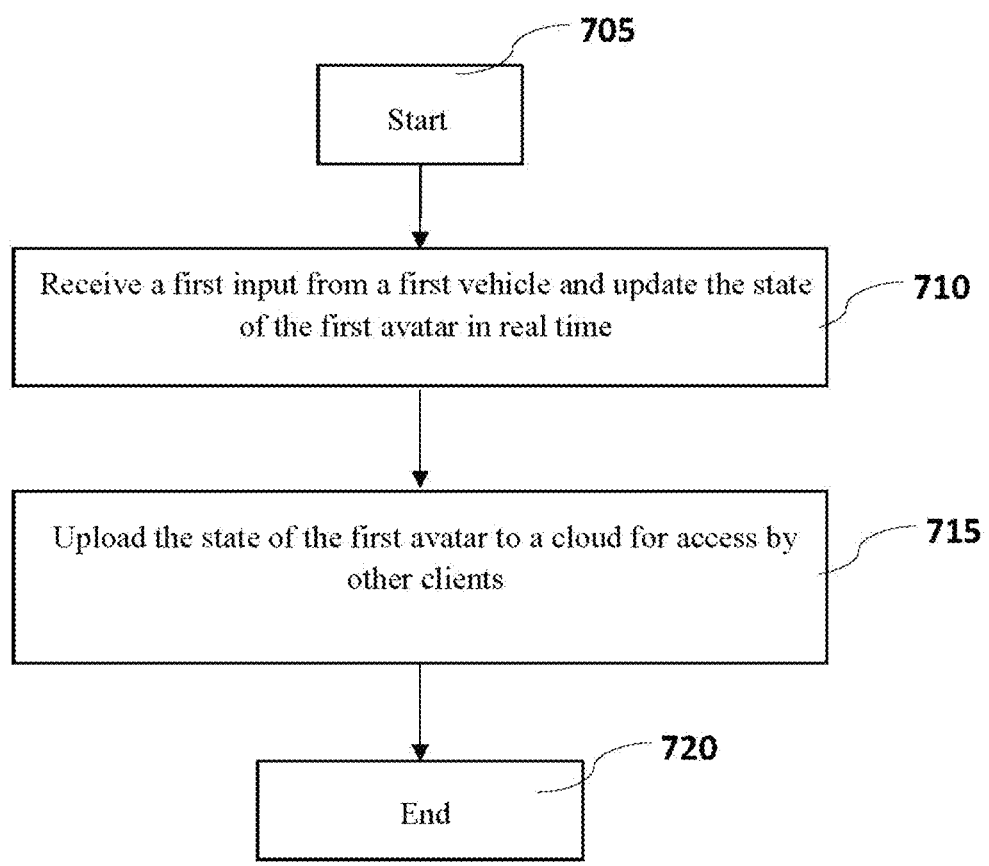
FIG. 7 shows a flowchart of steps implemented when executable instructions included in an embodiment of an interactive system according to the present disclosure are executed.

FIG. 7 shows an embodiment of data synchronization of the first avatar. The method begins at step 705, and then a first input from the first vehicle is received and the state of the first avatar is updated in real time at step 710. Next at step 715, the updated state of the first avatar may be uploaded to the cloud for access by other clients of the user. This helps the user himself or related personnel to obtain latest state of the first avatar, and obtain corresponding reminders. The seamless connection of the avatar can further enhance the emotional association. The method then ends at 720.

Figure 8:
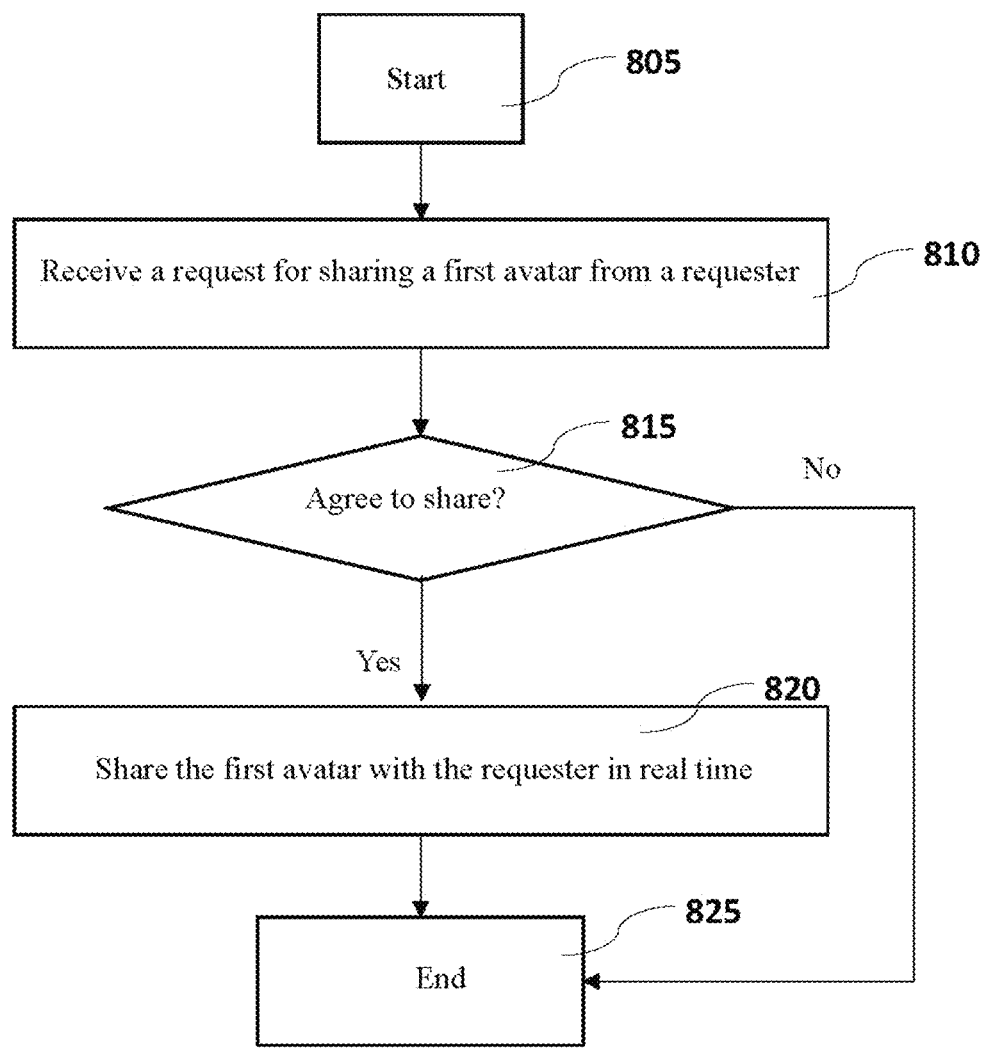
FIG. 8 shows a flowchart of steps implemented when executable instructions included in an embodiment of an interactive system according to the present disclosure are executed.

FIG. 8 shows how one party may begin to request the sharing of the other party's avatar in one non-limiting embodiment. The method begins at 805, and then a request to share a first avatar from a requester is received by a user at 810. For example, this may be a piece of message sent via V2V. At 815, the user of the first vehicle receiving the request may choose to agree or refuse sharing, and in some embodiments which part of the state to share. For example, the user may choose to share the state only on the navigation page, or the user may choose to share the vehicle environment, or share fault state of the vehicle, phone state, and so on. Alternatively, the user can also set other custom sharing methods. In other embodiments, agree sharing means two-way sharing of data. For example, after the user of the first vehicle agrees sharing his first avatar, the user of the first vehicle can also receive the information of the requester's avatar at the same time. In still other embodiments, only one-way sharing is possible. For example, after the user of the first vehicle agrees sharing his first avatar, the user of the first vehicle will not receive the information of the requester's avatar, unless the user of the first vehicle also issues a sharing request and obtains the consent of the requester. The method ends at 825 when the user refuses sharing. If the user agrees sharing, at step 820, the first avatar is shared with the requester in real time, and the requester can view the state of the first avatar of the first vehicle on its vehicle-side or clients. The method then ends at step 825 when the user exits, the vehicle stops, the journey ends, etc.

Figure 9:
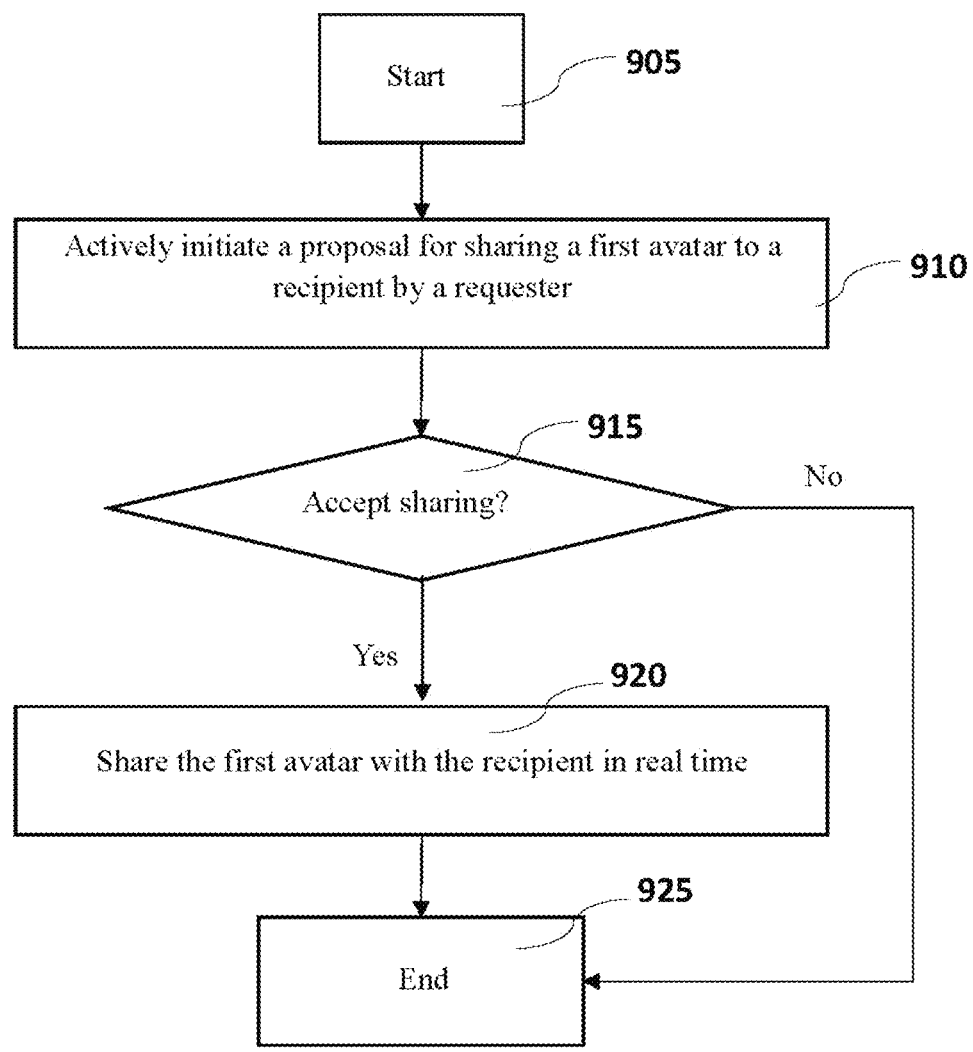
FIG. 9 shows a flowchart of steps implemented when executable instructions included in an embodiment of an interactive system according to the present disclosure are executed.

FIG. 9 shows an embodiment of how actively share an avatar. The method begins at 905, and then the requester actively initiate a proposal for sharing a first avatar to a recipient at step 910, for example, the user of the first vehicle can send the first avatar to the vehicle side or clients of the second vehicle. The user of the second vehicle as the recipient can choose to accept or refuse at step 915. Similarly, in some embodiments, sharing means two-way sharing. For example, after the user of the first vehicle shares his first avatar, if the user of the second vehicle chooses to accept, the user of the first vehicle can also simultaneously receive the information of the second avatar of the second vehicle. In still other embodiments, only one-way sharing is possible. For example, after the user of the first vehicle shares his first avatar, the user of the second vehicle can choose to accept, at this time, the real time state of the first avatar will be displayed to the second vehicle, while the user of the first vehicle will not receive the information of the second avatar of the second vehicle unless the user of the first vehicle also issues a sharing request and obtains the consent of the user of the second vehicle. The method ends at 925 when the user refuses to share. If the user agrees to share, at step 920, the first avatar is shared in real time with the recipient such as the second vehicle, and the second vehicle can view the state of the first avatar of the first vehicle on its vehicle side or clients. Then, when the user exits, or the vehicle stops, or the journey ends, etc., the method ends at step 925.

Figure 10A:
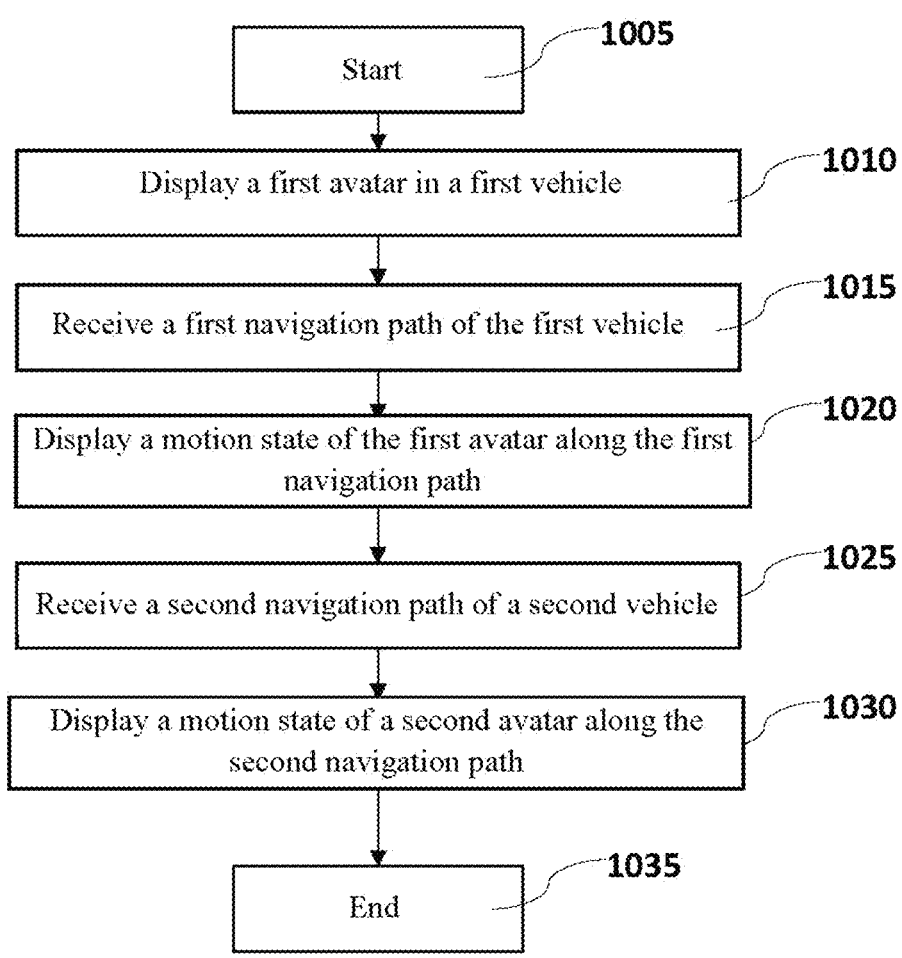
FIG. 10A shows a flowchart of steps implemented when executable instructions included in an embodiment of an interactive system according to the present disclosure are executed.
Figure 10B:
FIG. 10B shows a possible layout view in an embodiment of an interaction system according to the present disclosure.

FIG. 10A shows an embodiment of a method for displaying an avatar in a navigation interface. The method begins at 1005, and then a first avatar is displayed in a first vehicle at 1010. At step 1015, a first navigation path of the first vehicle is received, e.g., the user may choose to enter the navigation interface after entering the vehicle. At 1020, a motion state of the first avatar along the first navigation path is displayed on the navigation interface. At step 1025, a second navigation path for a second vehicle may be received, and at 1030, a motion state of the second avatar along the second navigation path is displayed. The method then ends at 1035. FIG. 10B shows one possible display interface in which the first and second avatars are displayed on a navigation map.

Figure 11:
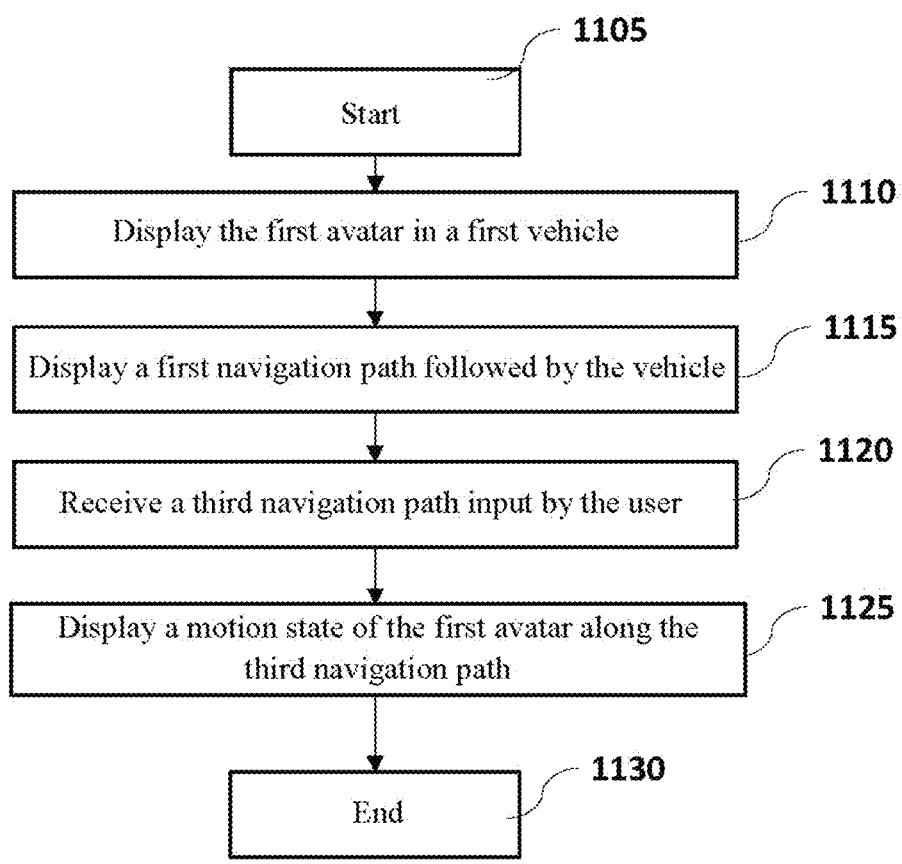
FIG. 11 shows a flowchart of steps implemented when executable instructions included in an embodiment of an interactive system according to the present disclosure are executed.

FIG. 11 shows an embodiment of a display mode of an avatar. In the described embodiment, the method begins at 1105, and a first avatar is displayed in a first vehicle at step 1110, e.g., the first avatar may be displayed on a first navigation path followed by the first vehicle. Then, at step 1120, a third navigation path input by the user may be received, thereby at step 1125, a motion state of the first avatar along the third navigation path is displayed. The third navigation path may be an actual navigation path with beautiful scenery selected by the user, or a virtual path automatically selected. As the vehicle moves, virtual races can be held in the same virtual path for avatars of multiple users. For example, one or more avatars can display different running states and can be ranked according to one or more parameters after the race. etc., thus enhancing the fun and social attributes. The method then ends at 1130.

Figures 12, 13:
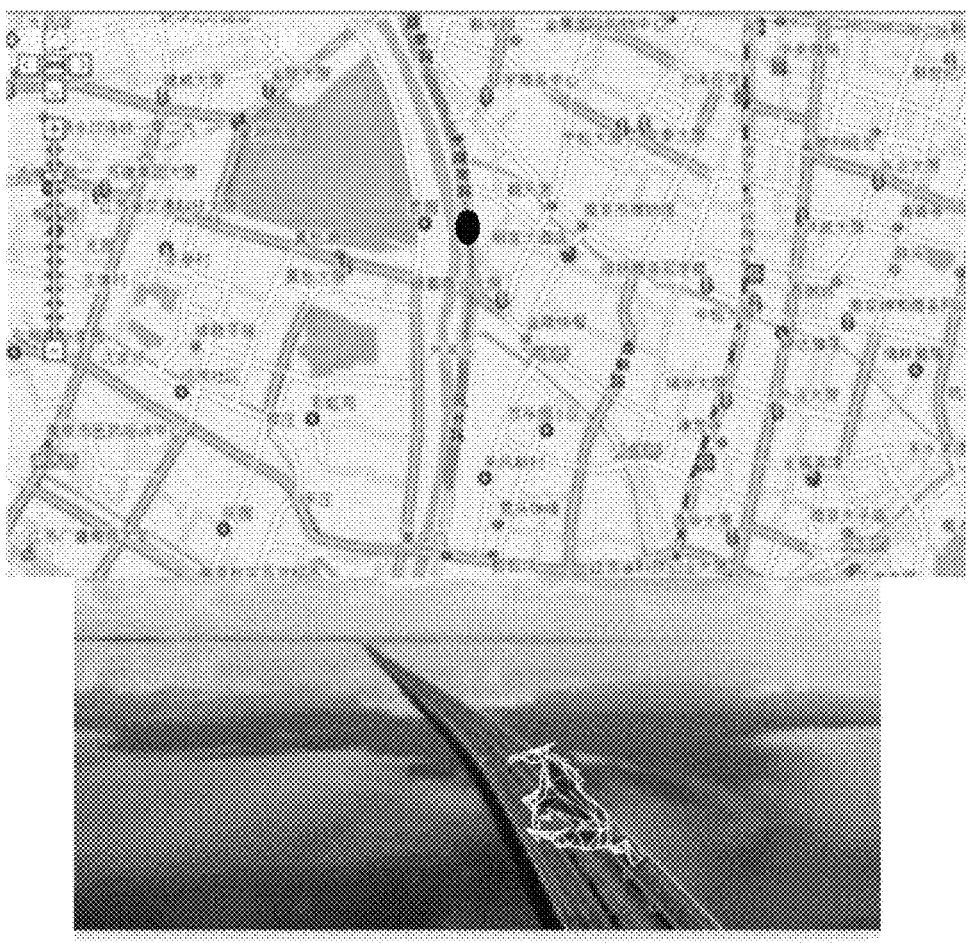
FIG. 12 shows a possible page layout view in an embodiment of an interaction system according to the present disclosure.
FIG. 13 shows a setting page layout of an avatar according to an embodiment of the present disclosure.

In the above-mentioned embodiment, the display 4 can be divided into different display areas. For example, the first avatar and the second avatar are displayed in the determined area. The motion state of the second avatar can be displayed in different scales, and the motion state of the vehicle owner's own avatar is mainly displayed. Of course, the user can adjust the size and proportion of the display according to their needs. In other embodiments, camera device data from the first vehicle and the second vehicle may be displayed within a predetermined display area. For example, a specific display area or a specific sub-display screen is provided to display information related to the avatar. In one embodiment, for example, when the user is using navigation, the display page may be divided into a main display area, for example, in which the first avatar and the second avatar are displayed on the navigation map interface, and an auxiliary display area, in which the data from the camera device of the first vehicle and the data from the camera device of the second vehicle are displayed. For example, FIG. 12 shows one possible display interface. In the figure, the navigation page is at the top, and the virtual route data of the avatar or the data of the camera device are superimposed at the bottom. As described in one or more of the above embodiments, the environment in which the avatar is located may also be different from the environment of the actual driving route of the current vehicle. In the case of semi-autonomous or automatic driving, the image that the avatar has passed may also be projected onto the vehicle windows, vehicle interiors or windshields, when the vehicle is actually on a noisy street or in a traffic jam, the user can see the scene of the virtual moving along a scenic route, allowing the user to have a pleasant ride. In the case of multiple displays 4, various display settings can also be customized according to specific conditions to match the structure of the vehicle/display or the user's preference.

FIG. 13 shows a schematic layout of a content page of an avatar. For example, at the vehicle side or extended to other clients of the user, the user's avatar can have a picture character selected by the user, and the user can set a nickname, gender or other attributes. As mentioned above, there can be different levels for avatars according to the conditions of vehicle use. Other functions can be integrated into the backend of the avatar, for example, a shopping mall can also be provided, and the user can choose to use the changed equipment. In addition, as described in the above embodiments, more social functions can be provided. For example, friends or family members can be added, so that the states of each other's avatars can be easily seen, greetings through the avatars can be completed, and driving itineraries can be shared with each other and so on. In other embodiments, the user can also have a virtual race with selected friends, for example, as described in the above embodiments, the user can set the same or different virtual scenes for multiple avatars while driving. In one or more embodiments, ranking can be based on one or more predefined features such as energy saving, distance, speed, etc., and one or more features such as safe driving, energy saving and environmental protection can be selected to evaluate and give corresponding avatars level changes. Those skilled in the art can envision other possible designs.

In addition, according to another aspect of the present disclosure, a vehicle 100 is also provided, as shown in FIG. 1. The vehicle 100 includes the vehicle interaction system 1 described above. It should be understood that all the embodiments, features and advantages set forth above for the vehicle interaction system 1 according to the present disclosure apply equally to the vehicle 100 according to the present disclosure, provided that they do not conflict with each other. That is to say, all the above-described embodiments of the vehicle interaction system 1 and variations thereof can be directly transferred to the vehicle 100 according to the present disclosure, and directly incorporated herein. For the sake of brevity of the present disclosure, the description is not repeated here.

The present disclosure proposes a vehicle interaction system 1 and a corresponding vehicle 100 and an interaction method, which can integrate existing application, functions and information in the interactive interface, provide a unified and orderly presentation effect for the interaction between the vehicle and the user and significantly improve the interaction efficiency with users and user satisfaction.

One or more embodiments of the present disclosure provide methods and systems for interacting with other vehicles using avatars associated with the states of relevant vehicles, as well as vehicles or other mobile terminals or mobile platforms that can implement such methods and provide such systems. These embodiments provide communication convenience for a series of scenarios such as semi-autonomous driving or autonomous driving, interaction between family members, socializing among friends, and group travel. Under the premise of technical feasibility, the technical features listed above for different embodiments may be combined with each other to form additional embodiments within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-mentioned embodiments are possible examples of implementations of the present disclosure and are given only for the purpose of enabling those skilled in the art to clearly understand the principles of the invention. It should be understood by those skilled in the art that the above discussion to any embodiment is only illustrative, and is not intended to imply that the disclosed scope of the embodiments of the present disclosure (including claims) is limited to these examples; under the overall concept of the invention, the technical features in the above embodiments or different embodiments can be combined with each other to produce many other changes in different aspects of embodiments of the invention that is not provided in detailed description for the sake of brevity. Therefore, any omission, modification, equivalent replacement, improvement, etc. made within the spirit and principle of the embodiment of the invention shall be included in the scope of protection claimed by the invention.

That which is claimed is:

1. An interaction system for a first vehicle, comprising a processor and a memory, the memory storing processor-executable instructions that, when executed by the processor, cause the latter to implement steps comprising:
    receiving a first input from the first vehicle and displaying a first avatar on a display, the first input comprising a first planned route for the first vehicle to follow to a destination and a current location of the first vehicle along the first planned route;
    receiving a second input from a second vehicle and displaying a second avatar on the display, wherein the first input and the second input are updated in real time, and the first avatar and the second avatar dynamically change accordingly, wherein dynamically changing the first avatar in real time comprises displaying movement of the first avatar along the first planned route, wherein the first input and the second input each comprise one or more of the following state inputs: fault information, warning information, travel information, mileage information, road environment information, schedule reminders, weather reminders, emergency traffic alerts, call reminders, social software reminders, and reminders set by other applications;
    receive a plurality of state inputs corresponding to a state of a vehicle;
    prioritize each state input of the plurality of state inputs according to user needs;
    assign each state input of the plurality of state inputs an avatar state of a plurality of avatar states;
    display each avatar state of the plurality of avatar states in order accordingly in response to the priority.

2. The interaction system of claim 1, wherein the steps comprise: receiving input data from a first camera device of the first vehicle, and displaying on the display a visual output of the first avatar superimposed with the input data.

3. The interaction system of claim 1, wherein the steps comprise: receiving input data from a second camera device of the second vehicle, and displaying on the display a visual output of the second avatar superimposed with the input data.

4. The interaction system of claim 1, wherein the steps further comprise: synchronizing the first avatar to a cloud for access by other clients of users of the first vehicle.

5. The interaction system of claim 1, wherein the steps further comprise: initiating a proposal for sharing the first avatar to a recipient user, and sharing real time state of the first avatar with the recipient user in response to receipt of feedback from the recipient user agreeing to share, the real time state of the first avatar comprising safety related feature information of the first vehicle.

6. The interaction system of claim 1, wherein the steps further comprise: receiving a request for sharing the first avatar from a requester user, issuing feedback agreeing or refusing the request, and sharing real time state of the first avatar with the requester user based on the feedback agreeing the request.

7. The interaction system of claim 1, wherein the steps comprises:
    receiving second navigation path information from the second vehicle, the second navigation path information comprising a second planned route for the second vehicle to follow to a second destination and a current location of the second vehicle along the second planned route; and
    displaying movement of the second avatar along the second navigation path information in real time.

8. The interaction system of claim 7, wherein the steps comprise: dividing a navigation interface of the display into a main display area and an auxiliary display area, wherein movement of the first vehicle is displayed in the main display area on a first scale and the movement of the second avatar is displayed in the auxiliary display area on a second scale different from the first scale.

9. The interaction system of claim 7, wherein the steps comprises: dividing a navigation interface of the display into a main display area and an auxiliary display area, wherein the movement of the first avatar and the second avatar are displayed in the main display area on a navigation map interface, and data from a camera device of the first vehicle and/or data from a camera device of the second vehicle are displayed in the auxiliary display area.

10. The interaction system of claim 7, wherein the steps comprise: displaying on the display the movement of the first avatar and the second avatar along a virtual path different from an actual navigation path of the first planned route of the first vehicle and the second planned route of the second vehicle, wherein the movement of the first avatar and the second avatar along the virtual path are based on the movement of the first vehicle and the second vehicle along the first planned route and the second planned route respectively, and wherein the movement of the first avatar and the second avatar along the virtual path is a race.

11. An interaction method for a first vehicle and a second vehicle, wherein the first vehicle includes a processor and a memory, the memory storing processor-executable instructions that, when executed by the processor, cause the latter to implement steps comprising:
receiving a first input from the first vehicle and displaying a first avatar on a display, the first input comprising a first planned route for the first vehicle to follow to a destination and a current location of the first vehicle along the first planned route; and
receiving a second input from the second vehicle and displaying a second avatar on the display, wherein the first input and the second input are updated in real time, and the first avatar and the second avatar dynamically change, wherein dynamically changing the first avatar in real time comprises displaying movement of the first avatar along the first planned route, wherein the first input and the second input include one or more of the following: fault information, warning information, travel information, mileage information, road environment information, schedule reminders, weather reminders, emergency traffic alerts, call reminders, social software reminders, and reminders set by other applications;
receive a plurality of state inputs corresponding to a state of a vehicle;
prioritize each state input according to user needs;
assign each state input of the plurality of state inputs an avatar state of a plurality of avatar states; and
display each avatar state of the plurality of avatar states in order accordingly in response to the priority.

12. The interaction method of claim 11, wherein the first input and the second input further include interaction information from a user, wherein the interaction information from the user include any one or more of the following: voice, touch, text input, facial expressions or actions, hand gestures or actions, head gestures or actions, and body gestures or actions.

13. The interaction method of claim 11, wherein the steps further comprise: initiating a proposal for sharing the first avatar to a recipient user by a user of the first vehicle, and sharing real time state of the first avatar with the recipient user in response to receipt of feedback from the recipient user agreeing to share, the real time state of the first avatar comprising safety related feature information of the first vehicle.

14. The interaction method of claim 11, wherein the steps further comprise: receiving a request for sharing the first avatar from a requester user, issuing feedback agreeing or refusing the request, and sharing real time state of the first avatar with the requester user based on the feedback agreeing the request.

15. An interaction system for a first vehicle, comprising a processor and a memory, the memory storing processor-executable instructions that, when executed by the processor, cause the latter to implement steps comprising:
receiving a first input from the first vehicle and displaying a first avatar on a display, the first input comprising a first planned route for the first vehicle to follow to a destination and a current location of the first vehicle along the first planned route;
receiving a second input from a second vehicle and displaying a second avatar on the display, wherein the first input and the second input are updated in real time, and the first avatar and the second avatar dynamically change accordingly, wherein dynamically changing the first avatar in real time comprises displaying movement of the first avatar along the first planned route;
receiving second navigation path information from the second vehicle, the second navigation path information comprising a second planned route for the second vehicle to follow to a second destination and a current location of the second vehicle along the second planned route;
displaying movement of the second avatar along the second navigation path information in real time; and
dividing a navigation interface of the display into a main display area and an auxiliary display area, wherein movement of the first vehicle is displayed in the main display area on a first scale and the movement of the second avatar is displayed in the auxiliary display area on a second scale different from the first scale.

16. An interaction system for a first vehicle, comprising a processor and a memory, the memory storing processor-executable instructions that, when executed by the processor, cause the latter to implement steps comprising:
receiving a first input from the first vehicle and displaying a first avatar on a display, the first input comprising a first planned route for the first vehicle to follow to a destination and a current location of the first vehicle along the first planned route;
receiving a second input from a second vehicle and displaying a second avatar on the display, wherein the first input and the second input are updated in real time, and the first avatar and the second avatar dynamically change accordingly, wherein dynamically changing the first avatar in real time comprises displaying movement of the first avatar along the first planned route;
receiving second navigation path information from the second vehicle, the second navigation path information comprising a second planned route for the second vehicle to follow to a second destination and a current location of the second vehicle along the second planned route;
displaying movement of the second avatar along the second navigation path information in real time; and
displaying on the display the movement of the first avatar and the second avatar along a virtual path different from an actual navigation path of the first planned route of the first vehicle and the second planned route of the second vehicle, wherein the movement of the first avatar and the second avatar along the virtual path are based on the movement of the first vehicle and the second vehicle along the first planned route and the second planned route respectively, and wherein the movement of the first avatar and the second avatar along the virtual path is a race.

\* \* \* \* \*